(12) United States Patent
Long

(10) Patent No.: US 8,279,854 B2
(45) Date of Patent: Oct. 2, 2012

(54) METHOD, EQUIPMENT AND SYSTEM FOR DEREGISTERING A WIRELESS IP ACCESS NETWORK CONTACT ADDRESS

(75) Inventor: Shuiping Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 12/421,037

(22) Filed: Apr. 9, 2009

(65) Prior Publication Data

US 2009/0190501 A1    Jul. 30, 2009

Related U.S. Application Data

(63) Continuation of application No. PCT/CN2008/070842, filed on Apr. 29, 2008.

(30) Foreign Application Priority Data

Apr. 30, 2007   (CN) .......................... 2007 1 0103625

(51) Int. Cl.
  *H04L 12/28* (2006.01)
(52) U.S. Cl. ......... 370/352; 370/254; 370/338; 455/466
(58) Field of Classification Search .................. 370/352, 370/328; 455/433, 435.1, 466; 709/230
  See application file for complete search history.

(56) References Cited

U.S. PATENT DOCUMENTS

| | | | | |
|---|---|---|---|---|
| 6,330,441 | B1 * | 12/2001 | Onodera et al. | 455/426.1 |
| 6,470,179 | B1 * | 10/2002 | Chow et al. | 455/406 |
| 6,546,253 | B1 * | 4/2003 | Chow et al. | 455/439 |
| 2003/0186681 | A1 * | 10/2003 | Gabor | 455/411 |
| 2004/0184452 | A1 * | 9/2004 | Huotari et al. | 370/384 |
| 2004/0205212 | A1 * | 10/2004 | Huotari et al. | 709/230 |
| 2005/0117591 | A1 | 6/2005 | Hurtta et al. | |

(Continued)

FOREIGN PATENT DOCUMENTS

CN    1650656 A    8/2005

(Continued)

OTHER PUBLICATIONS

3$^{rd}$ Generation Partnership Project; Technical Specification Group Services and System Aspects; IP Multimedia Subsystem (IMS); Stage 2 (Release 7), *3GPP*, Technical Specification 23.228 V7.7.0: 56-61 (Mar. 2007).

(Continued)

*Primary Examiner* — Hassan Kizou
*Assistant Examiner* — Emmanuel Maglo
(74) *Attorney, Agent, or Firm* — Leydig, Voit & Mayer, Ltd.

(57) ABSTRACT

A method and equipment for deregistering a wireless IP access network contact address are provided. When a call corresponding to a common subscriber ID of a TE is received after the TE leaves an IP access network abnormally, the method and the equipment can avoid problems caused by still delivering the subsequent call from the IP access network according to an IP access network contact address associated with the common subscriber ID. The method includes notifying an IMS network to deregister a contact address of a TE in a first wireless IP access network through a current available access network of the TE if the contact address of the TE in the first wireless IP access network is not deregistered to the IMS network when the TE leaves the first wireless IP access network.

14 Claims, 5 Drawing Sheets

U.S. PATENT DOCUMENTS

| | | | |
|---|---|---|---|
| 2005/0159156 A1* | 7/2005 | Bajko et al. | 455/435.1 |
| 2005/0176428 A1 | 8/2005 | Gabor et al. | |
| 2005/0243840 A1* | 11/2005 | Sivalingam et al. | 370/401 |
| 2005/0259679 A1* | 11/2005 | Chowdhury et al. | 370/465 |
| 2006/0030320 A1 | 2/2006 | Tammi et al. | |
| 2006/0149847 A1* | 7/2006 | Meskauskas et al. | 709/229 |
| 2006/0153120 A1* | 7/2006 | Channasamudhram | 370/328 |
| 2007/0135146 A1* | 6/2007 | Rezaiifar et al. | 455/466 |
| 2008/0013619 A1* | 1/2008 | Meylan et al. | 375/240 |
| 2008/0032691 A1* | 2/2008 | Kyzivat | 455/435.1 |
| 2008/0092226 A1* | 4/2008 | Horvath et al. | 726/12 |
| 2008/0132231 A1* | 6/2008 | Balasubramanian | 455/435.1 |
| 2008/0316962 A1* | 12/2008 | Wu et al. | 370/329 |
| 2009/0093249 A1* | 4/2009 | Zhu et al. | 455/433 |
| 2010/0008352 A1* | 1/2010 | Przybysz et al. | 370/352 |
| 2011/0051701 A1* | 3/2011 | Cai et al. | 370/338 |

FOREIGN PATENT DOCUMENTS

| | | |
|---|---|---|
| CN | 1816022 A | 8/2006 |
| CN | 1838610 A | 9/2006 |
| KR | 2004-0057858 A | 7/2004 |
| WO | WO 2006/016236 A1 | 2/2006 |

OTHER PUBLICATIONS

International Search Report in corresponding International Patent Application No. PCT/CN2008/070842 (Aug. 14, 2008).

Written Opinion of the International Searching Authority in corresponding International Patent Application No. PCT/CN2008/070842 (Aug. 14, 2008).

Office Action in corresponding European Patent Application No. 08734200.2 (Dec. 4, 2009).

Supplementary European Search Report in corresponding European Patent Application No. 08734200.2 (Sep. 22, 2009).

Mahendran et al., "X.P00xx-0—VCC Between WLAN and HRPD Systems That Use VoIP Using Simple IP," Jun. 2006, Version v0.1, $3^{rd}$ Generation Partnership Project, Valbonne, France.

"X.P0042—Voice Call Continuity Between IMS and Circuit Switched Systems —Stage 2," Aug. 2006, Version: v0.84, $3^{rd}$ Generation Partnership Project, Valbonne, France.

* cited by examiner

METHOD, EQUIPMENT AND SYSTEM FOR DEREGISTERING A WIRELESS IP ACCESS NETWORK CONTACT ADDRESS

CROSS-REFERENCE TO RELATED APPLICATIONS

This application is a continuation of International Patent Application No. PCT/CN2008/070842, filed Apr. 29, 2008, which claims priority to Chinese Patent Application No. 200710103625.0, filed Apr. 30, 2007, both of which are hereby incorporated by reference in their entirety.

FIELD OF THE INVENTION

The present invention relates to the wireless communication field, and more particularly, to a method, equipment, and system for deregistering a wireless IP access network contact address.

BACKGROUND

With the rapid progress of the communication technology, in the future 3G network architecture, a mobile network is no longer limited to a circuit switching mode, but has gradually evolved to an internet protocol (IP) network. As we step into the R5 stage of the 3rd Generation Partnership Project (3GPP), a core network of the universal mobile telecommunications system (UMTS) is divided into three subsystems, namely, a circuit switched (CS) domain, a packet switched (PS) domain, and an IP multimedia subsystem (IMS).

The IMS is a subsystem superimposed on the existing packet domain in the wideband code division multiple access (WCDMA) network which is newly added in 3GPP R5 stage. The main functional entities in the IMS include: a call session control function (CSCF) entity, adapted to provide a user registration control function and a session control function; an application server (AS), adapted to provide a logic function of controlling various service; a home subscriber server (HSS), adapted to provide a centralized management of subscribers' subscription data; and a media gateway control function (MGCF)/IMS Media Gateway (IM-MGW) entity, adapted to realize an intercommunication with the circuit switching network. Furthermore, the CSCF may be divided into a proxy CSCF (P-CSCF), a serving CSCF (S-CSCF), and an inquiring CSCF (I-CSCF). A terminal equipment (TE) accesses the IMS through the P-CSCF of the local place where the TE is located currently. Session and service trigger control and interaction with the AS service control are implemented by the home domain S-CSCF of the place where the TE is registered, and the I-CSCF is adapted to realize (for example, inquiry) the route from the P-CSCF to the S-CSCF.

The IMS is at the core control layer, and an access network for accessing the IMS network may be any IP access network, including a WCDMA network, code division multiple access 2000 (CDMA2000) network, wireless local access network (WLAN), high rate packet data (HRPD) network. Alternatively, an asymmetric digital subscriber line (ADSL) network and a cable network can also access the IMS. The core control layer provided by the IMS has nothing to do with the accessing motion.

With the development of the communication network, the IMS will coexist with the existing 2G network represented by a global system for mobile communication (GSM) and CDMA for a long time. During this time period, the IMS mainly covers the regions with a high demand for data services in large and medium-sized cities, and the IP access networks exist as hot islands or isolated islands in the sea of 2G or 3G networks. After a TE enters a certain IP access network and gains an IP connection, it registers for a contact address (an IP address assigned by the IP access network) with the IMS network. After the network and the TE have authenticated each other successfully, the current IP address binds with one or more common subscriber identities (IDs) of a subscriber of the TE. After the IMS registration, the TE can initiate a call through the common subscriber ID, or receive a call from other subscriber terminals. When an IMS registrar, i.e., the S-CSCF, receives a session invitation from other TE to the current TE, that is, a target of the received invitation is the common subscriber ID of the current TE, the IMS registrar extracts an IP address corresponding to the common subscriber ID according to the previous binding, replaces the target in the session invitation with the IP address, and sends the session invitation to the current TE through the IP access network. When the TE leaves the IP access network, the TE initiates deregistration to realize unbinding of the current IP address of the TE and the common subscriber ID. After the TE has performed the IMS un-registration (deregistration), the IMS registrar no longer sends a session invitation to the TE through the IP access network.

The process of the TE for initiating a session initiation protocol (SIP) registration with the IMS through a UMTS network is as shown in FIG. 1. The TE initiates the registration through a PS accessing part of the UMTS network (including two parts, namely, CS and PS). The TE first acquires an IP address in the PS access network, and sends a register message REGISTER (sip: xxxxx.com SIP/2.0, To:<sip: Walter®xxxxx.com>, Contact:<SIP:[5555::1:2:3:4]>; expires=7200) according to the acquired IP address. In the register message, the sip:xxxxx.com indicates that the final destination of the message is a registrar. The header To indicates a common subscriber ID to be registered (for identifying a subscriber, and it is an account in a communication network). The header Contact indicates the IP address of the TE in the UMTS access network. The parameter "expires" indicates the time duration that the TE wants to register (7200 s, i.e., two hours), and if the parameter "expires" is set to 0, it indicates that the TE wants to perform an IP address deregistration. The above SIP registration aims at informing the registrar: the common subscriber ID can be visited via a contact address (the IP address) indicated in the header Contact. The register message is sent to the S-CSCF through the P-CSCF and the I-CSCF, and an authentication for an initial registration of the TE is performed by the S-CSCF, thereby completing the registration.

After the registration is completed, if the TE or the P-CSCF wants to acquire more messages of the subscriber registration, it sends a SUBSCRIBE message to the S-CSCF to subscribe the subscribers' registration state. After performing the subscription, whenever the registration state of the TE is changed, the S-CSCF sends the registration state of the TE to another TE or the P-CSCF through a NOTIFY message, as shown in a broken-line frame in FIG. 1.

After the TE has successfully registered for the contact address with the IMS network, the TE can initiate a re-registration at any time by sending a new REGISTER request to the IMS network. For example, since the timeout occurs to the registration time, the registration needs to be refreshed, and in this case, it needs a re-registration. The processing of the re-registration is completely the same as the initial SIP registration, but the bi-directional authentication between the TE and the network is not necessary.

The deregister process of a registered contact address may be initiated actively by the TE when leaving the IP access network, and a network side S-CSCF may also un-register (i.e., deregister) the registration of a subscriber whenever needed, for example, when a pre-paid TE uses up the balance when making a conversation, the IMS network deregisters the registration of the subscriber. When the IMS network needs to perform the subscriber deregistration, the S-CSCF sends a deregister notification to the TE and the P-CSCF through a NOTIFY message, and the NOTIFY message indicates which common subscriber ID is to be deregistered, as shown in FIG. 2.

The processes of registration, re-registration, and deregistration for a common subscriber ID performed by a TE have been briefly illustrated above, and a voice call continuity (VCC) is introduced below. The VCC is at first proposed by the 3GPP and aims at solving the continuity problem between a circuit voice call of a circuit switching (CS) network and a voice over IP (VOIP) call based on the IP access network, which enables a TE to switch conveniently between the CS network (the CS part of the GSM or UMTS) and a WLAN access network.

The VCC technology is based on the IMS. In order to support the VCC, after a TE has completed the registration, the S-CSCF needs to perform an initial filter criteria (iFC) check on a network element VCC AS (introduced by the 3GPP2, and currently there are four independent functional blocks in the 3GPP) based on a subscriber allocation downloaded from the HSS. After the VCC AS passes the check, the S-CSCF performs a third-party registration with the VCC AS to notify the VCC AS that the TE has performed the IMS registration, and subsequently, the call of the TE can be received and delivered through the IP access network, as shown in FIG. 1. Likewise, after the TE is deregistered, the S-CSCF needs to perform the iFC check on the VCC AS based on the subscriber allocation downloaded from the HSS. After the VCC AS passes the check, the S-CSCF performs a third-party registration with the VCC AS to notify the VCC AS that "the TE has cancelled the IMS registration", and subsequently, the call of the TE cannot be received and delivered through the IP access network any more, as shown in FIG. 2.

When another TE initiates a call to the TE through the CS network, the signaling needs to enter the IMS network, the VCC AS is responsible for selecting a delivering domain for the call, i.e., selecting to deliver the call through the IP access network where the TE registers or through the CS network, and the network side delivers the call to a target TE through the selected IP access network or the CS network.

However, the inventors found that, when the TE leaves the IP access network abnormally, for example, the TE loses signals of the currently connected IP access network, but does not have enough time to deregister the contact address to the IMS network, when a call corresponding to the common subscriber ID is received. Subsequently, it is possible to still deliver the call through the IP access network, thereby causing a call delivery failure or a prolonged call establishing time.

SUMMARY

In an embodiment, the present invention is directed to a method for deregistering a wireless IP access network contact address, TE, IMS-based network side equipment, a network element (NE), and a system for deregistering a TE of a wireless IP access network. When a call to the TE is received subsequently after the TE leaves a certain IP access network abnormally, the present invention can avoid problems caused by delivering the subsequent call from the IP access network still according to the IP access network contact address associated with the subscriber ID.

In order to solve the above technical problems, in an embodiment, the present invention provides a method for deregistering a wireless IP access network contact address, which includes the following steps.

If a contact address of a TE in a first wireless IP access network is not deregistered to an IMS network when the TE leaves the first wireless IP access network, the IMS network is notified to deregister the contact address of the TE in the first wireless IP access network by a current available access network of the TE.

In an embodiment, the present invention further provides a TE, which includes a determination unit and a deregistration initiating unit.

The determination unit is adapted to determine whether the TE has deregistered a contact address of the TE in a first wireless IP access network to an IMS network or not when the TE leaves the first wireless IP access network.

The deregistration initiating unit is adapted to notify the IMS network to deregister the contact address of the TE in the first wireless IP access network through a current available access network of the TE, if the determination unit determines that the TE does not deregister the contact address of the TE in the first wireless IP access network to the IMS network.

In an embodiment, the present invention further provides IMS-based network side equipment, which includes a receiving unit and a deregistration unit.

The receiving unit is adapted to receive a notification of deregistering a contact address of a TE in a first wireless IP access network through a current available access network.

The deregistration unit is adapted to deregister the contact address of the TE in the first wireless IP access network after the receiving unit has received the notification of deregistering the contact address of the TE in the first wireless IP access network.

In an embodiment, the present invention further provides a network element, which is connected to an S-CSCF of an IMS network, and includes a determination unit and a notifying unit.

The determination unit is adapted to determine whether a CS domain message carries an indication that a TE has left a first wireless IP access network or not when receiving the CS domain message from the TE.

The notifying unit is adapted to notify the S-CSCF to deregister a contact address of the TE in the first wireless IP access network if the determination unit determines that the CS domain message carries the indication that the TE has left the first wireless IP access network.

In an embodiment, the present invention further provides a system for deregistering a TE of a wireless IP access network, which at least includes a TE, and an S-CSCF corresponding to the TE.

The TE is adapted to notify an IMS network to deregister a contact address of the TE in a first wireless IP access network through a current available access network of the TE if it is determined that the contact address of the TE in the first wireless IP access network is not deregistered to the IMS network when the TE leaves the first wireless IP access network.

The S-CSCF is adapted to deregister the contact address of the TE in the first wireless IP access network after receiving a notification of deregistering the contact address of the TE in the first wireless IP access network.

The main effect of the embodiments of the present invention lies in that, if a contact address of a TE in a first wireless IP access network is not deregistered to an IMS network when the TE leaves the first wireless IP access network, the IMS network is notified to deregister the contact address of the TE in the first wireless IP access network by a current available access network of the TE, so as to avoid problems of a call delivery failure or a prolonged call establishing time caused by further delivering a subsequent call for the TE from the wireless IP access network still according to an IP access network contact address associated with the subscriber ID of the TE after the TE leaves the wireless IP access network abnormally.

DETAILED DESCRIPTION

In order to make the objects, technical solutions, and advantages of the present invention be more comprehensible, the embodiments of the present invention are further described in detail below with reference to the accompanying drawings.

Figure 1:
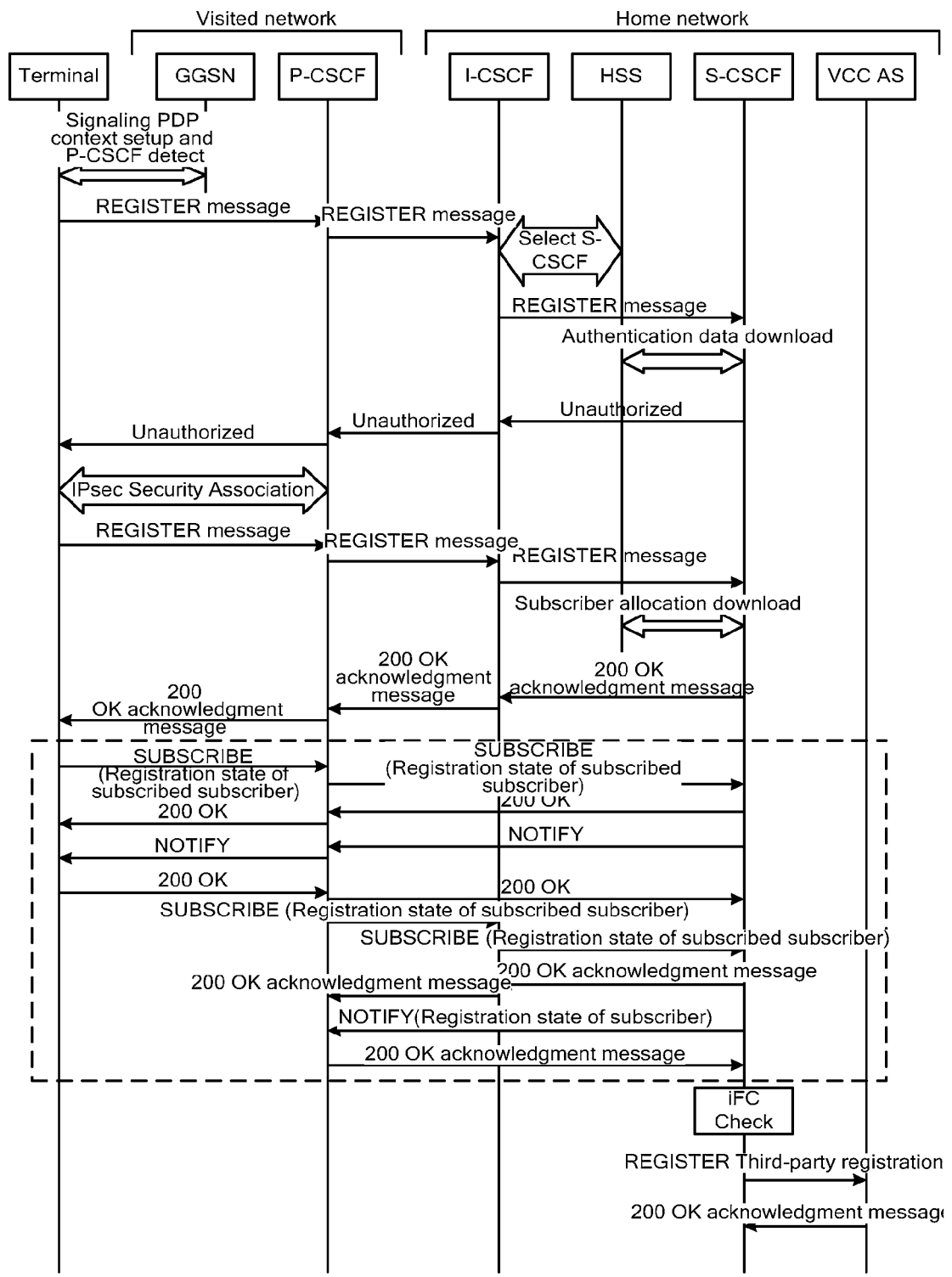
FIG. 1 is a flow chart of an IMS registration performed by a TE.
Figure 2:
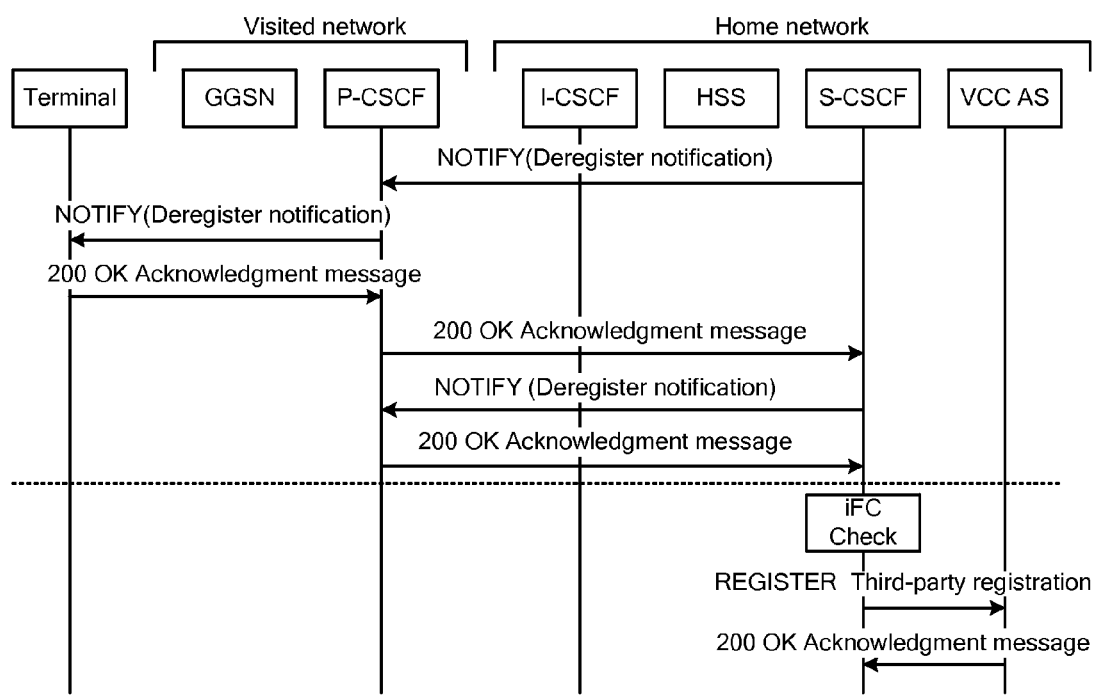
FIG. 2 is a flow chart of an IMS deregistration of a TE initiated by a network side.
Figure 3:
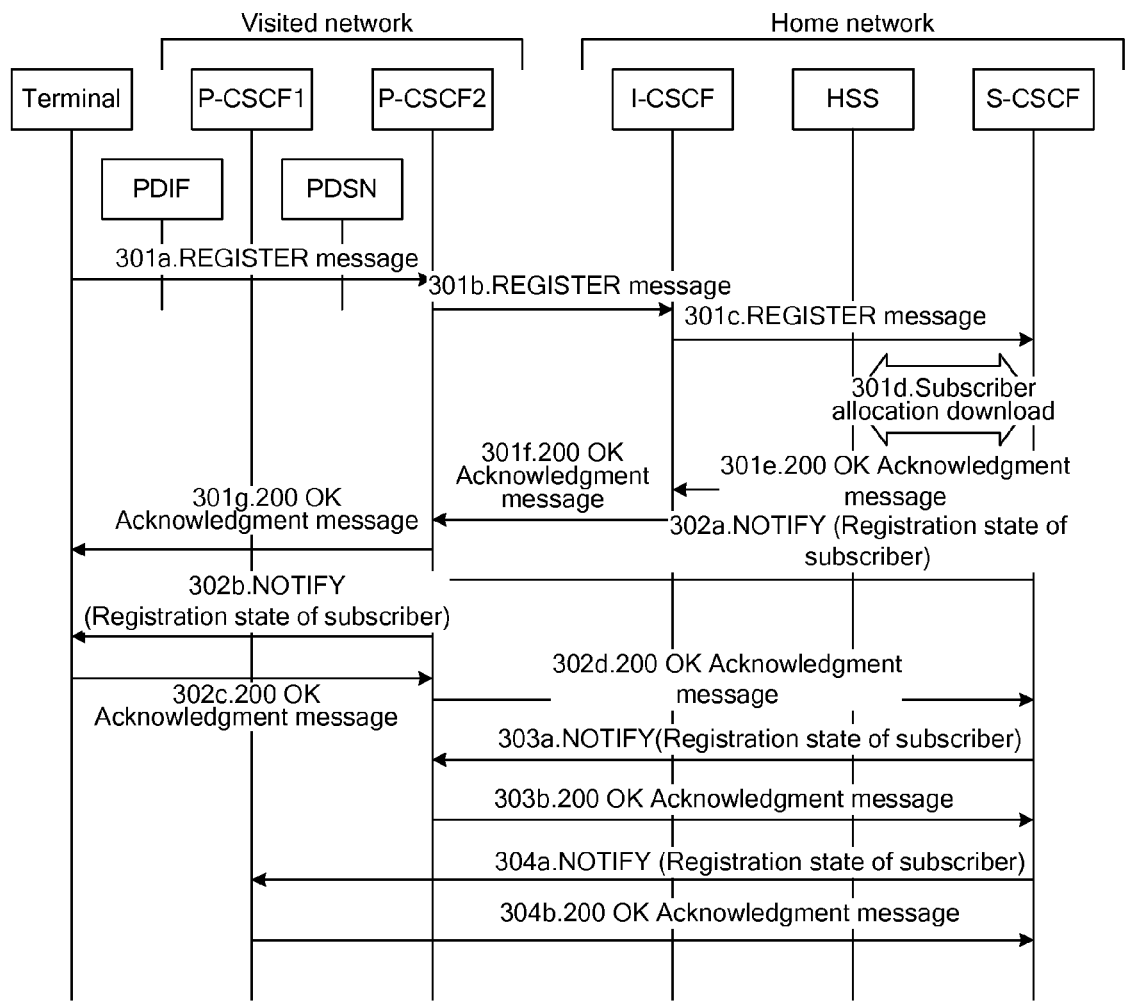
FIG. 3 is a flow chart of a method for deregistering a wireless IP access network contact address according to a first embodiment of the present invention.

A first embodiment of the present invention relates to a method for deregistering a wireless IP access network contact address. In this embodiment, a first wireless IP access network is a WLAN network, and the other access networks are HRPD networks. That is to say, when the TE leaves the WLAN network abnormally, it does not deregister a contact address of the WLAN network to an IMS network, but an HRPD network is available currently, so that the TE deregisters the contact address of the WLAN network to the IMS network through the HRPD network. An IP address assigned to the HRPD network is 5555::1:2:3:4; an IP address assigned to the WLAN network is 5555::5:6:7:8. The specific deregistration flow chart is shown in FIG. 3.

In Steps 301a to 301g, after detecting a signal loss of the WLAN network, the TE sends a REGISTER message to a P-CSCF2 serving the HRPD network through the HRPD network, and the REGISTER message is sent to an S-CSCF where the TE belongs to via an I-CSCF. The REGISTER message includes.

(Contact:<SIP:[5555::1:2:3:4]>; expires=7200;Contact:<SIP:[5555::5:6:7:8]>; expires=0), in which "Contact:<SIP:[5555::1:2:3:4]>; expires=7200" indicates an IP address of the HPRD network that is re-registered to the IMS network, and the registration expires after 7200 seconds (i.e., two hours); "Contact:<SIP:[5555::5:6:7:8]>; expires=0" indicates an IP address of the WLAN network that is deregistered to the IMS network. After the S-CSCF receives the REGISTER message, it returns an acknowledgement message.

In the embodiment, the TE has subscribed a subscriber's registration state to the S-CSCF.

In Steps 302a to 302d, the S-CSCF updates the registration state of the TE, in which the updated registration state is that the contact address of the WLAN network is deregistered, and the contact address of the HPRD network is re-registered, and then the S-CSCF sends a NOTIFY message to the TE to notify the updated registration state information to the TE. After the TE receives the NOTIFY message, it returns an acknowledgement message.

In Steps 303a and 303b, the S-CSCF sends the NOTIFY message to the P-CSCF2 serving the HRPD network to notify the registration state information of the subscriber of the TE. After the P-CSCF2 receives the NOTIFY message, it returns an acknowledgement message.

In Steps 304a and 304b, the S-CSCF identifies a P-CSCF associated with the deregistered contact address, i.e., a P-CSCF1 serving the WLAN network, sends the NOTIFY message to the P-CSCF1 to notify the registration state information of the subscriber of the TE. After the P-CSCF1 receives the NOTIFY message, it returns an acknowledgement message, instructs the WLAN network to release a wireless access resource related to the subscriber, and further deletes the registration information of the subscriber according to the registration state information. Alternatively, the P-CSCF1 instructs the WLAN network to release the wireless access resource related to the subscriber, or delete the registration information of the subscriber according to the registration state information. Thus, it can avoid the problems such as a call delivery failure or a prolonged call establishing time caused by delivering a subsequent call from the WLAN network still according to the WLAN network contact address associated with the subscriber ID of the TE when the subsequent call for the TE is received after the TE leaves the WLAN network abnormally, and meanwhile avoids the wastes of the WLAN network wireless access resources.

In the existing systems, as for a re-registration process, a register message is sent to an S-CSCF, and the S-CSCF updates the registration of the subscriber, for example, updates the registration time, or cancels the registration (i.e., deregistration), and notifies the registration state of the subscriber to a P-CSCF. Accordingly, when a register message sent by other access networks carries the information of deregistering the WLAN network contact address, the S-CSCF is triggered to identify a P-CSCF associated with the deregistered contact address, and sends the registration state information to the P-CSCF. The P-CSCF deletes the registration information of the subscriber according to the registration state information, and possibly further instructs the WLAN network to release the wireless access resource related to the subscriber. Therefore, when the TE leaves the WLAN network abnormally, it can still deregister timely, so as to avoid the unnecessary problems caused by delivering a subsequent call of the TE still from the WLAN network, thereby avoiding the wastes of the wireless access resources of the WLAN network.

It should be noted that, this embodiment assumes that, in a re-registration process, the network side does not perform authentication on the TE, so as to omit the registration relevant steps. In practical applications, an authentication may also be performed on a TE according to the existing systems, which does not affect the effect of this embodiment. Moreover, in the embodiment, the first wireless IP access network is, for example, a WLAN network, and the other access network is, for example, an HRPD network. However, in practical applications, the first wireless IP access network may be an HRPD network, and the other access network may be a WLAN network, and the specific implementations thereof are similar to this embodiment, which thus are not described in detail here.

A second embodiment of the present invention also relates to a method for deregistering a wireless IP access network contact address. The second embodiment is different from the first embodiment, and particularly, in the first embodiment, after the TE leaves the WLAN network abnormally, another wireless IP access network (an HRPD network) is currently available, so that the TE deregisters to the WLAN network through a re-registration process with the HRPD network. But in this embodiment, after the TE leaves the WLAN network abnormally, there is no wireless IP access network available currently, but only a CS network such as CDMA 1× or GSM is available. Therefore, the TE notifies a VCC AS that "the TE has left the WLAN network" by using a message transmission mechanism of the CS network such as short message service (SMS) or unstructured supplementary services data (USSD), and then the VCC AS requests the S-CSCF to initiate a deregistration process of the TE. The specific flow can be obtained with reference to FIG. 4. Briefly speaking, another network unit here may be a centralized service control unit, i.e., in the case that the TE can also access to the IMS network through the CS network, the TE notifies an adaptive processing unit (i.e., the centralized service control unit) from the CS network to the IMS network that "the TE has left the WLAN network", and then the centralized service control unit requests the S-CSCF to initiate the deregistering process of the TE.

Figure 4:
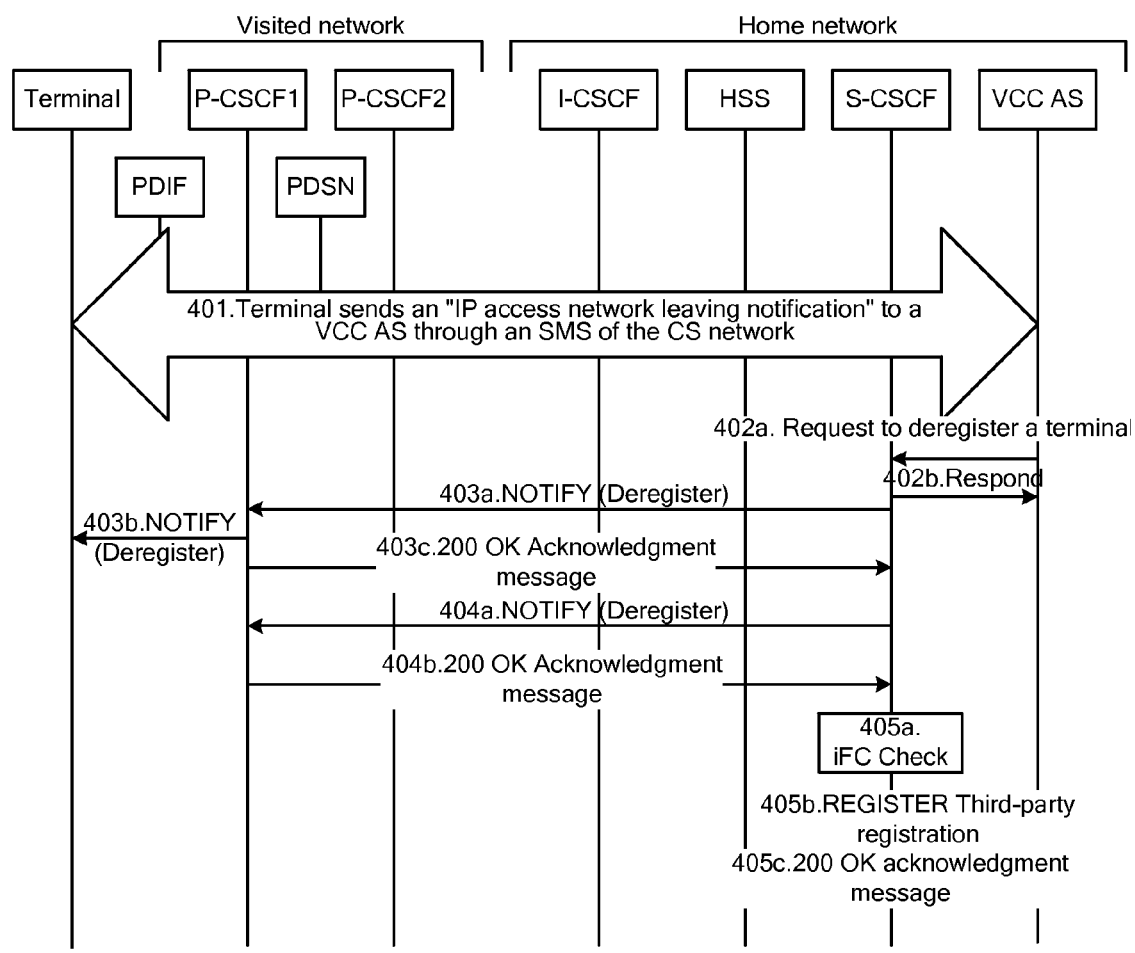
FIG. 4 is a flow chart of a method for deregistering a wireless IP access network contact address according to a second embodiment of the present invention.

The method for deregistering a wireless IP access network contact address as shown in FIG. 4 is illustrated in detail below. In Step 401, after a TE has detected a signal loss of the WLAN network, the TE encapsulates the information that "the TE has left the WLAN network" as a content of an SMS message and sends the SMS message with the VCC AS as a destination address to notify the VCC AS that the TE has left the WLAN network.

In Steps 402a and 402b, after receiving the SMS message, the VCC AS determines that the TE has left the WLAN network, and notifies an S-CSCF to deregister the WLAN network contact address for the subscriber.

The VCC AS may notify the S-CSCF in various manners, for example, the VCC AS sends a Message to request the S-CSCF to initiate the deregistering process for the TE, or sends a NOTIFY message to notify the S-CSCF that "the TE has left the IP access network."

After receiving the notification, the S-CSCF returns an acknowledgement message.

In Steps 403a to 403c, the S-CSCF identifies a P-CSCF associated with the deregistered contact address, i.e., a P-CSCF1 serving the WLAN network, sends the NOTIFY message to the TE through the P-CSCF1 to indicate that the TE has been deregistered from the IMS network. Since the WLAN network signals are lost, the TE cannot receive the NOTIFY message, the P-CSCF1 returns a 200 OK acknowledgment message to the S-CSCF in the name of the TE after waiting until the timeout of the reply message from the TE.

In Steps 404a and 404b, the S-CSCF sends the NOTIFY message to the P-CSCF1 to indicate that the TE has been deregistered. After receiving the NOTIFY message, the P-CSCF1 returns an acknowledgement message, deletes the registration information of the subscriber according to the NOTIFY message, and further instructs the WLAN network to release the wireless access resources related to the subscriber. Therefore, when a subsequent call for the common subscriber ID of the TE is received after the TE leaves the WLAN network abnormally, the above method can avoid the problems such as a call delivery failure or a prolonged call establishing time caused by delivering the subsequent call from the WLAN network still according to the WLAN network contact address associated with the subscriber ID of the TE, thereby further avoiding the wastes of the WLAN network wireless access resources.

In Steps 405a to 405c, the S-CSCF performs an initial filter criteria (iFC) check on the VCC AS based on a subscriber allocation downloaded from the HSS. After the VCC AS passes the check, the S-CSCF performs a third-party registration with the VCC AS to notify the VCC AS that "the TE has been IMS deregistered from the WLAN network", and the subsequent call for the TE cannot be delivered through the WLAN network. After receiving the notification, the VCC AS returns an acknowledgement message.

It belongs to a common technology for persons skilled in the art that the S-CSCF initiates an IMS deregistration actively, and particularly, a state that the TE has left the WLAN network is notified to a NE connected (directly or indirectly connected) to the S-CSCF through a CS domain message, and then the NE triggers the S-CSCF to initiate the IMS deregistration actively. In this way, when a call for the common subscriber ID of the TE is received subsequently after the TE leaves the IP access network abnormally, the problems caused by delivering the call from the WLAN network still according to the WLAN network contact address associated with the subscriber ID can be avoided. Since the above messages and the IMS deregistration process are existing in the existing systems, this embodiment can be implemented conveniently.

A third embodiment of the present invention also relates to a method for deregistering a wireless IP access network contact address, which is substantially the same as the first embodiment or the second embodiment, but the difference there-between lies in that, in the first embodiment or the second embodiment, upon detecting a signal loss of the first wireless IP access network, the TE initiates an IMS deregistration immediately, including initiating a re-registration process through another access network, or sending a CS domain message; whereas in this embodiment, upon detecting a signal loss of the first wireless IP access network, the TE activates a timer. If the TE fails to access to the first wireless IP access network again before the timer expires, i.e., it fails to detect the signal of the first wireless IP access network once again, the IMS deregistration is performed. Through setting the timer, the TE is prevented from frequently performing the IMS registration and deregistration to the first wireless IP access network, thereby reducing the energy consumption of the TE.

Figure 5:
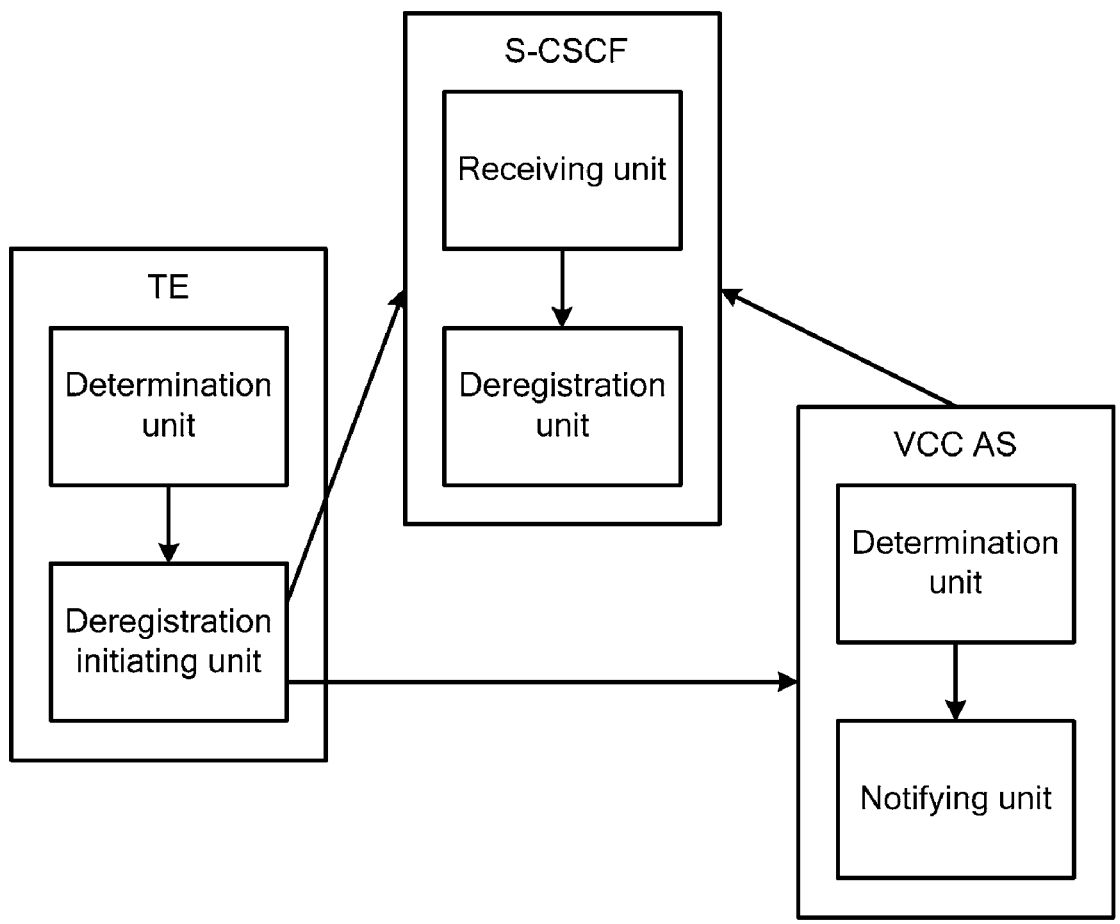
FIG. 5 is a structural view of a system for deregistering a TE of a wireless IP access network according to a fourth embodiment of the present invention.

A fourth embodiment of the present invention relates to a system for deregistering a TE of a wireless IP access network. As shown in FIG. 5, the system includes at least one TE, an S-CSCF and a VCC AS corresponding to the TE. The TE includes a determination unit and a deregistration initiating unit. The determination unit is adapted to determine whether the TE deregisters a contact address of the TE in a first wireless IP access network to an IMS network when the TE leaves the first wireless IP access network. The deregistration initiating unit is adapted to notify the IMS network to deregister the contact address of the TE in the first wireless IP access network through another current available access network of the TE if the determination unit determines that the TE does not deregister the contact address of the TE in the first wireless IP access network to the IMS network. Therefore, when a call for the common subscriber ID of the TE is received subsequently after the TE leaves the WLAN network abnormally, the problems such as a call delivery failure or a prolonged call establishing time caused by delivering the call from the IP access network still according to the IP access network contact address associated with the subscriber ID can be avoided.

The deregistration initiating unit notifies the S-CSCF of the IMS network to deregister the contact address of the TE in the first wireless IP access network through another current available access network of the TE.

When said another current available access network of the TE is a wireless IP access network, for example, WLAN or HRPD, the deregistration initiating unit further includes the following subunits: a deregister information setting unit and a re-registration subunit. The deregister information setting unit is adapted to set information of deregistering the first wireless IP access network in a re-registration message. The re-registration subunit is adapted to initiate a re-registration process to said another current available access network and send the information of deregistering the first wireless IP access network set by the deregister information setting unit to the S-CSCF through the re-registration message. In the existing systems, as for a re-registration process, a register message is sent to an S-CSCF, and the S-CSCF updates the registration of the subscriber, for example, updates the registration time, or cancels the registration (i.e., deregistration), notifies the registration state of the subscriber to a P-CSCF, and instructs the P-CSCF to delete the registration information of the subscriber. Therefore, when the TE leaves the IP access network abnormally, the TE can still perform the IMS deregistration timely, which thus avoids the unnecessary problems caused by delivering a subsequent call of the TE still from the IP access network.

Alternatively, when the current available access networks of the TE are only CS domain networks, for example, a CDMA 1× network or a GSM network, the deregistration initiating unit further includes the following subunits: a leaving indication setting unit and a sending unit. The leaving indication setting unit is adapted to set an indication that the TE has left the first wireless IP access network in a CS domain message. The sending unit is adapted to send the CS domain message to a VCC AS through another current available access network and trigger the VCC AS to instruct the S-CSCF to deregister a contact address of the TE in the first IP access network through the indication set in the CS domain message that the TE has left the first wireless IP access network. Since the CS domain message exists in the existing systems, this embodiment utilizes existing messages to trigger the S-CSCF to actively initiate deregistering the contact address in the first wireless IP access network of the TE without adding additional signaling, which can avoid the problems caused by delivering a subsequent call of the TE still from the IP access network after the TE leaves the IP access network abnormally, and meanwhile, the implementation of this embodiment is quite convenient. In addition, the CS domain message in this embodiment may be an existing SMS message or USSD message.

The S-CSCF includes a receiving unit and a deregistration unit. The receiving unit is adapted to receive a notification of deregistering the contact address of the TE in the first wireless IP access network through the current available access network. The deregistration unit is adapted to deregister the contact address of the TE in the first wireless IP access network after the receiving unit has received the notification of deregistering the contact address of the TE in the first wireless IP access network.

The receiving unit receives the notification of deregistering the contact address of the TE in the first wireless IP access network from the current available access network in the following manners: receiving information of deregistering the first wireless IP access network during the re-registration process to another wireless IP access network initiated by the TE, in which the information includes the contact address; or receiving an indication that the TE has left the first wireless IP access network from the VCC AS.

The VCC AS includes a determination unit and a notifying unit. The determination unit is adapted to determine whether a CS domain message includes an indication that the TE has left the first wireless IP access network when receiving the CS domain message from the TE. The notifying unit is adapted to notify the S-CSCF to deregister the contact address of the TE in the first wireless IP access network if the determination unit determines that the CS domain message includes the indication that the TE has left the first wireless IP access network.

In addition, an embodiment of the present invention further provides a terminal equipment (TE), which includes a determination unit and a deregistration initiating unit. The determination unit is adapted to determine whether the TE has deregistered a contact address of the TE in a first wireless IP access network to an IMS network when the TE leaves the first wireless IP access network. The deregistration initiating unit is adapted to notify the IMS network to deregister the contact address of the TE in the first wireless IP access network through a current available access network of the TE, if the determination unit determines that the TE does not deregister the contact address of the TE in the first wireless IP access network to the IMS network.

Preferably, the TE further includes a confirm unit adapted to confirm that a time duration of the TE leaving the first wireless IP access network exceeds a predetermined time limit, and send a result of exceeding the predetermined time limit to the determination unit.

It should be noted that, the functions and effects of the TE are the same as that of the TE described above in FIG. 5. The details can be obtained with reference to the above descriptions, and thus are not described in detail here.

An embodiment of the present invention further provides an IMS-based network side equipment, which includes a receiving unit and a deregistration unit. The receiving unit is adapted to receive an indication that a TE has left a first wireless IP access network through a current available access network. The deregistration unit is adapted to deregister a contact address of the TE in the first wireless IP access network after the receiving unit has received the indication that the TE has left the first wireless IP access network. Particularly, the receiving unit may receive information of deregistering the first wireless IP access network from a re-registration process to another wireless IP access network initiated by the TE, or receive a notification of deregistering the contact address of the TE in the first wireless IP access network from an NE that receives a CS domain message.

It should be noted that, the functions and effects of the network side equipment are the same as that of the S-CSCF described above in FIG. 5, and the details thereof can be obtained with reference to the above descriptions, and thus are not described in detail here.

An embodiment of the present invention further provides a network element (NE), which is connected to an S-CSCF of an IMS network. The NE includes a determination unit and a notifying unit. The determination unit is adapted to determine whether a CS domain message includes an indication that a TE has left a first wireless IP access network when receiving the CS domain message from the TE. The notifying unit is adapted to notify the S-CSCF to deregister a contact address of the TE in the first wireless IP access network if the determination unit determines that the CS domain message includes the indication that the TE has left the first wireless IP access network.

It should be noted that, the functions and effects of the NE are the same as that of the VCC AS described above in FIG. 5, and the details thereof can be obtained with reference to the above descriptions, and thus are not described in detail here.

To sum up, in the embodiments of the present invention, if a TE does not deregister a contact address of the TE in a first wireless IP access network to an IMS network when the TE leaves the first wireless IP access network, the IMS network is notified to deregister the contact address of the TE in the first wireless IP access network through another current available access network of the TE. Therefore, when a call for the common subscriber ID of the TE is received subsequently after the TE leaves the IP access network abnormally, the present invention can avoid the problems such as a call delivery failure or a prolonged call establishing time caused by delivering the call from the IP access network still according to the IP access network contact address associated with the subscriber ID.

The TE initiates a re-registration process to another current available access network, carries information of deregistering a first wireless IP access network in the re-registration process, and sends the information of deregistering the first wireless IP access network to the S-CSCF. The S-CSCF deregisters a contact address of the TE in the first wireless IP access network according to the information. In the existing systems, as for a re-registration process, a register message is sent to an S-CSCF, and the S-CSCF can initiate deregistering a contact address of the TE in a certain IP access network to the IMS network. Therefore, by carrying the information of deregistering the first wireless IP access network in the register message from another access network, an existing re-registration process can be utilized to trigger the S-CSCF to actively initiate deregistering the contact address of the TE in the first wireless IP access network to the IMS network. Thus, when the TE leaves the first wireless IP access network abnormally, the TE can deregister timely, thereby avoiding the unnecessary problems caused by delivering a subsequent call of the TE still from the first wireless IP access network.

In the case that only the CS domain network such as a CDMA 1× network is available to the TE, the TE sends a CS domain message to the VCC AS through the CDMA 1× network, which indicates that the TE has left the first wireless IP access network; and then, the VCC AS is triggered through the CS domain message to instruct the S-CSCF to initiate deregistering the contact address of the TE in the first wireless IP access network. Since the CS domain message exists in the existing systems, the embodiment of the present invention can utilize existing messages to trigger the S-CSCF to actively initiate deregistering the contact address of the TE in the first wireless IP access network to the IMS network without adding additional signaling, which can avoid the problems caused by delivering a subsequent call of the TE still from the IP access network after the TE leaves the IP access network abnormally, and meanwhile, the implementation of this embodiment is quite convenient.

The VCC AS directly sends the received CS domain message carrying an indication that the TE has left the first wireless IP access network to the S-CSCF and triggers the S-CSCF to actively deregister the contact address of the TE in the first wireless IP access network. Alternatively, the VCC AS sends a deregister request message to the S-CSCF to request the S-CSCF to deregister the contact address of the TE in the first wireless IP access network, and thus it can be applied flexibly.

By means of setting a timer before performing a deregistration process, the TE is prevented from frequently performing the IMS registration and deregistration on the contact address of the TE in the first wireless IP access network.

The present invention has been illustrated and described with reference to the preferred embodiments. It will be apparent to those skilled in the art that various modifications and variations can be made to the present invention without departing from the scope or spirit of the present invention.

What is claimed is:

1. A method for deregistering a wireless IP access network contact address, comprising:
   notifying, by a terminal equipment (TE), an IP multimedia subsystem (IMS) network to deregister a contact address of the TE in a first wireless IP access network through a currently available access network of the TE other than the first wireless IP access network, if the contact address of the TE in the first wireless IP access network is not deregistered to the IMS network when the TE leaves the first wireless IP access network; and
   wherein the notifying the IMS network to deregister the contact address of the TE in the first wireless IP access network through the current available access network of the TE further comprises: notifying a service call session control function (S-CSCF) of the IMS network to deregister the contact address of the TE in the first wireless IP access network through the current available access network of the TE.

2. The method for deregistering a wireless IP access network contact address according to claim 1, wherein when the current available access network includes a second wireless IP access network, notifying the S-CSCF of the IMS network to deregister the contact address of the TE comprises:
   initiating, by the TE, a re-registration process to the second current available wireless IP access network, sending information for deregistering the first wireless IP access network to the S-CSCF through the re-registration process, triggering the S-CSCF to deregister the contact address of the TE in the first wireless IP access network.

3. The method for deregistering a wireless IP access network contact address according to claim 1, wherein when the current available access network includes a circuit switched (CS) domain network, notifying the S-CSCF of the IMS network to deregister the contact address of the TE comprises:
   sending, by the TE, a CS domain message indicating that the TE has left the first wireless IP access network to a first network element (NE) connected to the S-CSCF through the CS domain network; and
   notifying, by the first NE, the S-CSCF to deregister the contact address of the TE in the first wireless IP access network according to the CS domain message.

4. The method for deregistering a wireless IP access network contact address according to claim 1, wherein after the S-CSCF deregisters the contact address of the TE in the first wireless IP access network, the method further comprises at least one of:
   instructing the first wireless IP access network to release a wireless access resource allocated to the TE; and
   instructing the first wireless IP access network to deregister the TE.

5. The method for deregistering a wireless IP access network contact address according to claim 1, after the TE leaving the first wireless IP access network, the method further comprising:
   confirming that a time duration of the TE absent from the first wireless IP access network exceeds a predetermined time limit, and notifying the IMS network to deregister the contact address of the TE in the first wireless IP access network through the current available access network of the TE if the contact address of the TE in the first wireless IP access network is not deregistered to the IMS network.

6. The method for deregistering a wireless IP access network contact address according to claim 1, after the TE leaving the first wireless IP access network, the method further comprising:
confirming that a time duration of the TE absent from the first wireless IP access network exceeds a predetermined time limit, and notifying the IMS network to deregister the contact address of the TE in the first wireless IP access network through the currently available access network of the TE if the contact address of the TE in the first wireless IP access network is not deregistered to the IMS network.

7. The method for deregistering a wireless IP access network contact address according to claim 2, wherein the second wireless IP access network includes at least one of a wireless local access network (WLAN) and a high rate packet data (HRPD) network.

8. The method for deregistering a wireless IP access network contact address according to claim 2, after the TE leaving the first wireless IP access network, the method further comprising:
confirming that a time duration of the TE absent from the first wireless IP access network exceeds a predetermined time limit, and notifying the IMS network to deregister the contact address of the TE in the first wireless IP access network through the currently available access network of the TE if the contact address of the TE in the first wireless IP access network is not deregistered to the IMS network.

9. The method for deregistering a wireless IP access network contact address according to claim 3, wherein notifying, by the first NE, the S-CSCF to deregister the contact address of the TE comprises at least one of:
sending, by the first NE, at least one of a message indicating that the TE has left the first wireless IP access network to the S-CSCF and another message requesting to deregister the contact address of the TE in the first wireless IP access network to the S-CSCF.

10. The method for deregistering a wireless IP access network contact address according to claim 3, wherein the CS domain message includes at least one of a message of a short message service (SMS) and a message of an unstructured supplementary services data (USSD); and the first NE is a voice call continuity application server (VCC AS).

11. The method for deregistering a wireless IP access network contact address according to claim 3, wherein the first wireless IP access network includes at least one of a wireless local access network (WLAN) and a high rate packet data (HRPD) network; and
the CS domain network includes at least one of a code division multiple access (CDMA) 1× network and a global system for a mobile communication (GSM) network.

12. The method for deregistering a wireless IP access network contact address according to claim 3, after the TE leaving the first wireless IP access network, the method further comprising:
confirming that a time duration of the TE absent from the first wireless IP access network exceeds a predetermined time limit, and notifying the IMS network to deregister the contact address of the TE in the first wireless IP access network through the currently available access network of the TE if the contact address of the TE in the first wireless IP access network is not deregistered to the IMS network.

13. The method for deregistering a wireless IP access network contact address according to claim 4, after the TE leaving the first wireless IP access network, the method further comprises:
confirming that a time duration of the TE absent from the first wireless IP access network exceeds a predetermined time limit, and notifying the IMS network to deregister the contact address of the TE in the first wireless IP access network through the currently available access network of the TE if the contact address of the TE in the first wireless IP access network is not deregistered to the IMS network.

14. The method for deregistering a wireless IP access network contact address according to claim 9, after the TE leaving the first wireless IP access network, the method further comprising:
confirming that a time duration of the TE absent from the first wireless IP access network exceeds a predetermined time limit, and notifying the IMS network to deregister the contact address of the TE in the first wireless IP access network through the currently available access network of the TE if the contact address of the TE in the first wireless IP access network is not deregistered to the IMS network.

* * * * *